United States Patent [19]

Cheo et al.

[11] Patent Number: 4,897,622
[45] Date of Patent: Jan. 30, 1990

[54] SINGLE SIDEBAND WAVEGUIDE MODULATOR

[75] Inventors: Peter K. Cheo, Waterford; Gerald Meltz, Avon, both of Conn.

[73] Assignee: United Technologies Corporation, Hartford, Conn.

[21] Appl. No.: 288,291

[22] Filed: Dec. 22, 1988

[51] Int. Cl.$^4$ .......................... G02B 6/12; G02B 5/14; H01S 3/00
[52] U.S. Cl. .................................. 330/4.3; 350/91 R; 307/427; 357/30
[58] Field of Search ................... 332/7.51; 357/29, 30; 350/96.12, 96.13, 96.14, 377; 307/425, 427

[56] References Cited

U.S. PATENT DOCUMENTS

| | | | |
|---|---|---|---|
| 3,917,943 | 11/1975 | Auston | 357/30 |
| 3,924,931 | 12/1975 | Cheo | 350/96.14 |
| 3,984,675 | 10/1976 | Corcoran et al. | 332/7.51 |
| 4,124,270 | 11/1978 | Cheo | 350/96.12 |
| 4,169,009 | 9/1979 | Wagner et al. | 357/17 |
| 4,208,091 | 6/1980 | Cheo | 350/96.13 |
| 4,685,988 | 8/1987 | Wagner et al. | 350/96.12 |
| 4,693,549 | 9/1987 | Cheo | 350/96.12 |
| 4,707,060 | 11/1987 | Cheo et al. | 350/96.12 |

FOREIGN PATENT DOCUMENTS 3415523 10/1985 Fed. Rep. of Germany .

OTHER PUBLICATIONS

Schupital et al.; "Tunable Single-Sideband Generation in the Infrared", J. Appl. Phys., vol. 51, #5, pp. 2455-2457, 5/80; Abst. only supplied.
Lotspeich, J. F.; "Analyses of Electrooptic . . . Waveguide"; J. Lightwave Technol., vol. LT-3, #4, pp. 746-754, 8/85.
Carter et al.; "Optical Single Sideband Generation at 10.6 $\mu$m"; IEEE J. Quent. Electron., vol. QE-15, #4, pp. 217-224, 4/79.

Primary Examiner—Nelson Moskowitz
Attorney, Agent, or Firm—McCormick, Paulding & Huber

[57] ABSTRACT

A novel single sideband electro-optic modulator includes a planar waveguide structure allowing only circularly polarized optical and microwaves to propagate therein with equal phase velocities comprises a strip loaded GaAlAs/GaAs/GaAlAs structure with appropriate microstrip electrodes. The present modulator is readily fabricated using established microelectronic fabrication techniques and a modified MOCVD epitaxial growth process.

14 Claims, 2 Drawing Sheets

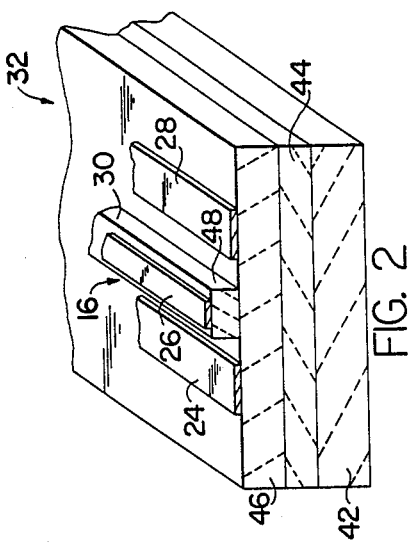
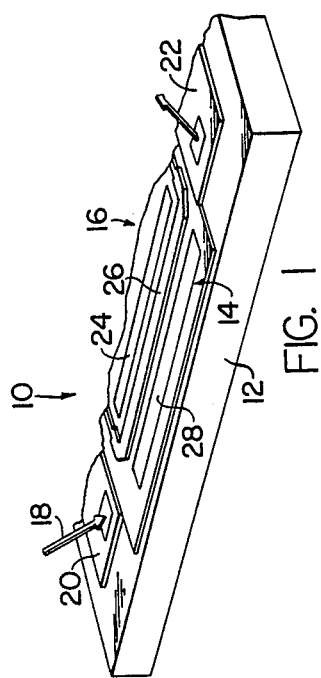
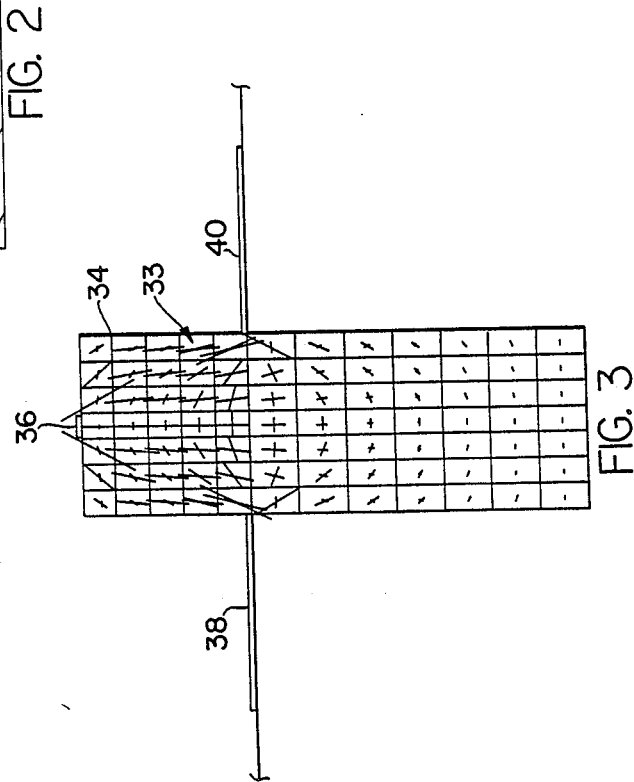

SINGLE SIDEBAND WAVEGUIDE MODULATOR

This invention was made under a Government contract and the Government has rights therein.

TECHNICAL FIELD

This invention relates to microwave infrared modulators and more particularly to modulators which are capable of single sideband frequency modulation.

BACKGROUND OF THE INVENTION

As is known, power conversion from a laser carrier frequency to the desired sideband frequency in the cases of double sideband and baseband modulators is severely limited by the fact that the modulated output power spectrum is distributed into two infinite series of upper and lower sideband signals. Consequently, the maximum power converted into the lowest order sideband can only reach about twenty percent of the total input power. Beyond this level, a large fraction of the power provided to a device generates high-order sideband signals. It has been demonstrated as early as 1962 at a HeNe laser wavelength and later in 1979 at the 10.6 microns $CO_2$ laser wavelength that it is possible to generate only a single sideband within a select frequency range at nearly 100 percent conversion efficiency. This is accomplished by creating either a right-hand or left-hand rotating optical indicatrix at an angular velocity $\omega_m/2$, where $\omega_m$ is the frequency of either a left-hand or a right-hand circularly polarized microwave which is launched into an electro-optic crystal having the proper orientation. If a circularly polarized optical wave is also launched into the crystal with the same sense of rotation to that of the microwave, the modulated output power spectrum would consist of the carrier and only one circularly polarized sideband at a frequency $\omega_m$ offset from the carrier frequency $\omega_o$ with an opposite sense of rotation, provided that a perfect phase-velocity match exists between the two travelling waves. However, the drive power required to generate 90 percent power conversion at the 10 micron laser wavelength can be as high as 60 kW using a bulk electro-optic crystal. It would be advantageous to have a single sideband microwave modulator characterized by high conversion efficiency and reduced microwave driving power. The present invention is drawn towards such a device.

SUMMARY OF THE INVENTION

An object of the present invention is to provide for an electro-optic modulator for generating single sideband modulation of an infrared laser signal.

Another object of the present invention is to provide for an electro-optic modulator for providing single sideband modulation of an infrared laser signal in both a coplanar and a ridge integrated optic structure.

According to the present invention, a planar electro-optic modulator for modulating an infrared laser signal at a carrier frequency with a microwave signal to generate signals in a single frequency sideband includes a thin film optical waveguide structure that has a laser signal guide region. The waveguide structure has a first major surface with an optical coupler disposed thereon at opposite ends of the laser guide region for receiving the laser signal. The guide region provides guided propagation of the laser signal therethrough. A microstrip electrode is configured on the first major surface in register with the laser guide region and has launching electrodes at each end thereof. The microstrip electrode provides for coupling of microwave signals to the laser guide region. The waveguide structure and the microstrip electrode are configured to launch only circularly polarized laser signals and microwave signals, respectively. The waveguide structure is further configured so that each of the circular polarized laser and microwave signals propagating along the laser guide region are characterized by phase velocities approximately equal in magnitude.

BRIEF DESCRIPTION OF THE DRAWINGS

FIG. 1 is a simplified schematic illustration showing a portion of a single sideband waveguide modulator provided according to the present invention.

FIG. 2 is a sectional illustration of a portion of the single sideband modulator of FIG. 1.

FIG. 3 is a simplified schematic illustration showing equi-potential contours and superimposed even and odd mode electric field plots for the modulator of FIG. 1.

DESCRIPTION OF THE PREFERRED EMBODIMENT

Figure 4:
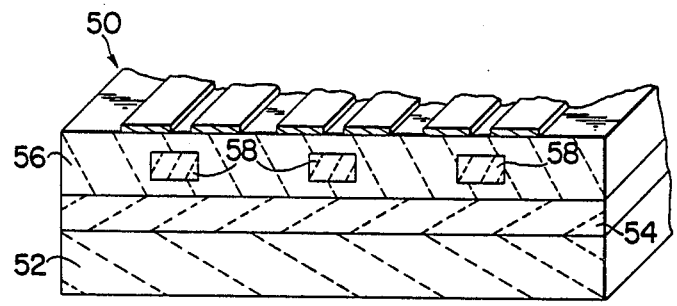
FIG. 4 is a simplified schematic illustration, in section, of a multichannel coplanar single sideband modulator provided according to the present invention.

Referring first to FIG. 1, a single sideband microwave modulator 10 provided according to the present invention includes a metal base 12 that receives a waveguide structure 14. The dimensions of the various components shown in FIG. 1 have been exaggerated for illustrative purposes.

A conventional microwave signal generator, not shown and not part of the present invention, provides microwave signals through a series of microwave terminals and launchers (also not shown and not part of the present invention) in a manner such as described in U.S. Pat. No. 4,707,060, referenced hereinabove. The microwave energy is launched along a microstrip network electrode 16. In response to the microwave energy, an electric field is established within the waveguide structure itself with the most intense electric field established in that portion of the waveguide in register with the microstrip electrode. As detailed hereinafter, the field produces a periodic change in the index of refraction of the waveguide material. Similar terminals are provided at the ends of the microstrip network electrode for terminating the field. The microstrip electrode is configured in a known manner so that only a forward travelling wave will exist within the modulator.

A coherent source (not shown and not part of the present invention) such as a $CO_2$ laser provides optical signals 18. The signal is coupled into and subsequently out of the modulator by use of coupling prisms or the equivalent on optical regions 20 and 22. The preferred prism couplers are not shown in FIG. 1 but may be of the right-angle germanium type having a prism geometry selected to provide excitation of the lower order orthogonal optical propagation modes within the waveguide structure. As detailed hereinafter, the thickness in geometry of the waveguide structure is chosen such that the optical waveguide will not support higher order guided modes. The periodically changing index refraction of the waveguide material provided by the applied microwave signal generates phase shift modulation of the laser beam propagating through the waveguide structure.

As shown in section in FIG. 2, the microstrip electrode 16 comprises three metal electrodes 24, 26 and 28. Electrode 26 is positioned on ridge or rib 30 which is raised from surface 32 of the waveguide structure and extends along the length thereof in registration therewith. Although shown in FIGS. 1 and 2 to be a ridge or rib structure, those skilled in the art will note that other types of guide and electrode structures such as a coplanar or stripline structure may be substituted.

Optical waveguides can be used to construct single sideband microwave modulators if the following requirements are met. Circularly polarized optical and microwave fields must be established in the common guiding region with a good match between the phase velocity of the optical and microwave guides; optical wave guides with a desired configuration must be obtained with the stress-induced birefringence less than a predetermined level. As detailed hereinafter, the present invention provides a waveguide modulator meeting these criteria and provides for a modulator comprising a strip-loaded GaAlAs/GaAs/GaAlAs structure with two preferred sets of microstrip electrodes. Such a structure can be made by using well established microelectronic fabrication techniques and modified Metal Organic Chemical Vapor Deposition (MOCVD) epitaxial growth. As further detailed herein, the present invention provides for a multichannel single sideband phased array modulator structure having increased power handling capability. Such a phased array waveguide modulator with N channels can provide a transmitted power N-times that of a single channel device, which can be as high as 10 W. Since a large fraction of the carrier power is transferred into only one single sideband, it is desirable to operate this modulator at the maximum phase shift frequency region ($V \cong V_\pi$). The power conversion efficiency of a device provided according to the present invention is primarily limited by the modal and stress-induced birefringence of the waveguide material.

The selection of a suitable microstrip optical waveguide configuration for single sideband frequency shifting is made on the basis of (1) the expected conversion efficiency, (2) the amount of unwanted sideband generation and (3) the power dissipation of the pumping microwave field. A geometry which provides the maximum overlap between the optical field and the colinear microstrip mode, the closest phase synchronism of the microwave pump and optical signal waves, and the least detuning due to modal and stress-induced birefringence is preferred.

An ideal optical waveguide is completely symmetric; as a result, orthogonal modes propagate with the same phase velocity. The application of a rotating microwave (pump) field spins the optical indicatrix at a uniform rate in a crystal with 3-fold symmetry. A slight amount of static birefringence distorts the optical index ellipse and causes highly nonlinear angular rotation which limits the maximum efficiency. With cubic crystals such as CdTe and GaAs, it can be shown that the [111] crystallographic axis has a 3-fold symmetry.

The effect of static birefringence on modulator efficiency will vary in different modulator configurations. An estimate which is useful in setting bounds on the maximum allowable birefringence can be obtained by evaluating the conversion from the fundamental to first sideband frequency in a uniform optical and microwave colinear plane wave interaction. The detuning is characterized by the equivalent static phase shift parameter $$B = (2L/\lambda)\delta n \qquad (1)$$

which is twice the corresponding static birefringent fringe shift. A value of $B = 0.5$, limits the maximum attainable conversion to about 60 percent. In a long crystal, the acceptable amount of modal degeneracy or stress-induced birefringence can be quite small. For example, if the objective is to obtain at least 60 percent conversion, then $$\delta n/n < 7 \times 10^{-5}, \text{ where } n = (n_x + n_y)/2 \qquad (2)$$

for GaAs. Alternatively, if $\delta n = 7 \times 10^{-5} n$, then $L < 1.2$ cm for $\lambda = 10.6$ microns.

Computing the modal birefringence in an optical waveguide and the stress-induced birefringence in an epitaxial layered configuration with high accuracy is complex. Those skilled in the art will note there are many approximation methods for determining the propagation constants of open dielectric waveguides, including highly accurate, commercially available finite element programs which can solve the vector wave equations for inhomogeneous optical waveguide structures as well as to determine the stress residual birefringence close to the mismatch in the thermal expansion coefficients and other thermoelectronic parameters of the layered materials. Although these computations can be carried out with precision, the accuracy of the results depend on the specific material parameters of the optical waveguide and of the layer deposition and the doping distribution.

The amount of modal birefringence in both ridge and stripline optical waveguides can be determined in a number of known ways, such as the one due to Marcatili detailed in the Bell System Technical Journal (BSTJ) Vol. 53, 1974 for estimating the effective value of modal birefringence ($\delta n$) in tightly bound equivalent waveguides. For computing modal birefrigence with the present invention, the mode shape factors are assumed. Once the equivalent slab dimensions are obtained, the known solution for the transverse electric (TE) and transverse magnetic (TM) modes can be used to estimate the propagation constants of the (primarily) x- and y-polarized, nearly degenerate modes. A comparison with propagation constants obtained by a numerical variational method for the case of a typical optical stripline reveals good agreement for the lowest order modes far above the frequency cut-off conditions.

For example, the equivalent slab method has been applied to an optical strip loaded ridge geometry wherein the ridge and substrate are composed of 10 percent Al and the waveguide layer is pure GaAs. These estimates show that the modal birefrigence can be reduced to acceptable values by proper design of the structure. A fairly thick layer, $t/\lambda \sim 1.4$ is required to reduce $\delta n/n$ below $8 \times 10^{-5}$.

As is known for devices having Al concentration doping in excess of 5 percent, the application of a static electric field between the strip line electrodes can be used to offset the modal birefrigence. For a laser beam wavelength of 10.6 microns only a small d.c. bias is required to compensate for the lack of modal degeneracy.

According to the present invention, the most accurate way to develop a modulator design and compare various types of optical waveguide structures is to use vector finite element (FEM or vector finite differential) methods to compute both the microstrip fields and the optical waveguide modes. It is adequate for both "rib" (ridge) and "stripline" (coplanar) modulator configurations to use a quasi-static FEM to obtain the microwave fields, the corresponding impedance and the effective dielectric constant or phase velocity. The latter parameter is determined from the capacitance of the structure and the known phase velocity with the specific material.

Equi-potential contours (curves 33) for a ridge configuration is shown in FIG. 3. In the figure are seen a ridge 34, a ridge electrode 36 and complementary electrodes 38 and 40. As detailed therein, a region of uniform circular polarization within the ridge or within the guiding layer depends on the size and spacing of the conductive strips. FEM computations also yields the microstrip transmission line properties for the microstrip configurations. Because of the significant amount of fringing fields in the air, the phase velocity in the ridge or rib tends to be significantly higher than that of waves travelling in bulk material. Calculations for the structure shown in FIG. 3 indicate that the effective microwave dielectric constant are in the range of 5 to 8 as compared to a bulk value of 10. Those skilled in the art will note that for phase matching with an optical beam the effective dielectric constant should be close to a value of 10. A top layer of material with a dielectric constant of approximately 10 can be added to adjust the effective dielectric constant. Less critical is that the characteristic microwave impedances associated with the even and odd modes are unequal. It is important to know the exact values thereof so that the correct power distribution between the modes can be made in order to obtain a circularly polarized wave in the active region or waveguide of the device. For electrode spacings in the range of 10 to 30 microns, the impedances are in the useful range of 50 to 100 ohms.

An initial design for a single sideband modulator of the present invention is arrived at by combining known microwave conversion efficiency results for a three electrode coplanar stripline channel guide modulator with the FEM computations for the microwave E-field distribution in rib electrode configurations detailed hereinabove. The present invention as shown in the device of FIGS. 1 and 2 demonstrate that the field-overlap and field uniformity corresponding to the geometry shown in FIG. 3 can also be obtained with the strip-loaded ridge waveguide. With such a modulator structure the static birefringence parameter B is about 0.5. With the present invention, the center electrode is raised and the electrostatic field region of uniform circular polarization is correspondingly adjusted to overlap the maximum optical fields in a GaAs layer. The conversion efficiency of this design is about 40 percent with $V = V_\pi$.

The material requirements for fabricating single sideband waveguides devices in accordance with the present invention are that (1) optical waves propagate along the isotroptic z-axis of the material; (2) the waveguide is doubly degenerate or symmetric in the x and y axes; (3) the waveguide is made of low-loss material and (4) the guiding layer must be relatively free from internal strain which can induce stress-birefringence of a significant magnitude.

Absorption of microwave power by the crystal that comprises the waveguide and its electrodes is also important. For GaAs, the loss tangent is $2 \times 10^{-3}$. The losses due to the currents in electrodes would be largest in microstrip structures, such as shown in FIGS. 1 and 2. Approximate values for attenuation due to metal electrode losses in these structures, where the electrode thickness and width are respectively 5 and 50 microns, are about 0.5 to 1 dB per cm. This corresponds to 30 to 50 percent power absorption in 3 cm long samples. Therefore, an important trade-off factor in selecting a device structure is the power dissipation and the means for transferring heat from the waveguide crystal area.

A device fabricated according to the present invention preferably includes the GaAlAs/GaAs/GaAlAs structure with the epitaxial layers grown on the [110] plane of a GaAs substrate. In this orientation, a narrow guiding channel along the isotroptic direction can be formed by either chemical etching or ionbeam milling. A GaAlAs buffered structure is selected to avoid the excessive optical power loss caused by metallic absorption.

As shown in section in FIG. 2, a device fabricated according to the present invention preferably includes a GaAs substrate 42. On the [110] plane thereof is grown a first layer 44 of $Al_{0.1}Ga_{0.9}As$ about 12 microns in thickness. A layer 46 of GaAs is then grown on the layer 44. It is preferable that these epitaxial layers be semi-insulating (have a high resistivity, greater than $10^5$ ohm-cm) to avoid excessive microwave power loss. A narrow guiding channel (30, FIG. 2) is formed by ion milling or chemical etching away a layer 48 of AlGaAs. A buffered AlGaAs material is preferred since excessive optical power losses caused by metallic absorption are avoided. For the device of FIG. 2, the GaAs layer 46 is grown to a thickness of 16 microns, and the channel is approximately 8 microns in thickness (corresponding to that of the AlGaAs layer 48) and 32 microns in width. Those skilled in the art will note that the above dimensions are for a device receiving 10.6 micron wave length radiation. The dimensions of a device receiving a laser beam at a different wavelength would scale accordingly.

It is preferable that the semi-insulating layers comprise intrinsic GaAs and AlGaAs layers. The growth of semi-insulating or high-resistivity epitaxial films of GaAs and AlGaAs of the type comprising the device by the MOCVD process is also feasible using triethoxyvanadyl (TEOV) as a dopant. High quality GaAs and AlGaAs epitaxial films with thicknesses greater than 20 microns grown on oriented GaAs substrates can be obtained. The surface of the GaAs epilayer is generally very smooth over a large area, about $\sim 1$ cm$^2$, with only occasional irregularities. However, those skilled in the art will note that the growth of AlGaAs epilayers on GaAs substrates is difficult at a growth temperature of 650° C. At that temperature the crystal surface morphology is extremely irregular. As the growth temperature is increased to 705° C., the morphology improves significantly. With the present invention the ideal growth temperature for AlGaAs epilayers on GaAs substrates is about 780° C. The use of triethoxyvanadyl to grow the semi-insulating epilayers does not introduce any difficulties to the process, provided that a properly designed MOCVD reactor system is employed.

A strip-loaded waveguide can be fabricated with the above epitaxial material to obtain 3-fold crystal symmetry. Such a waveguide can be made to support two nearly degenerate orthogonal modes so that a circularly polarized optical field can be excited in the guide. As noted above, a circularly polarized microwave can also be established in this guide by using either a ridge or coplanar stripline geometry with respect to a common ground plane. With a device fabricated in accordance with the present invention, 40 percent power conversion from the carrier to the desired sideband can be obtained by using a ridge GaAs/GaAlAs waveguide modulator at a drive power level equivalent to a $\pi$ phase-shift. It is possible to reach 65 percent or more power conversion at a drive power level equivalent to $V = 1.5\, V_\pi$.

Figure 5:
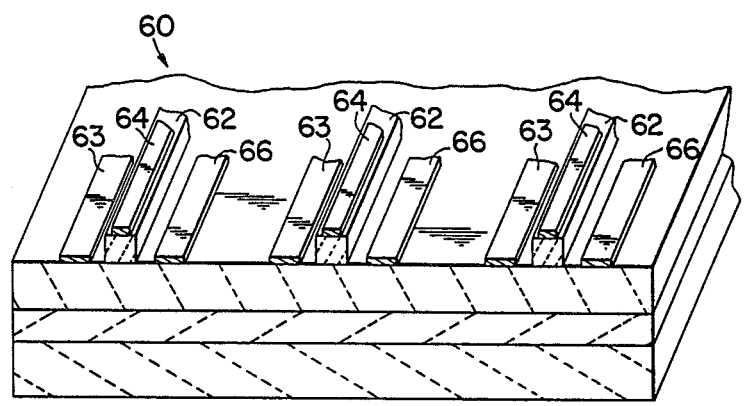
FIG. 5 is a simplified schematic illustration, in section, of a multichannel ridge single sideband modulator provided according to the present invention.

The power handling capability of a device can be increased significantly by replicating the single waveguide structure into an N channel array. FIG. 4 is a sectioned illustration of a coplanar electrode device 50 that comprises a GaAs substrate 52. On the [110] plane thereof is grown a layer 54 of $Al_{0.1}Ga_{0.9}As$ about 12 microns in thickness. A layer 56 of GaAs is then grown on the layer 54. A plurality of narrow guiding channels indicated schematically at 58, are formed by a combination of epitaxial growth and microelectronic processing methods, such as ion implantation, diffusion build etched channels, etc. The amount of power that the device 50 can safely handle is proportional to the number of waveguides fabricated therein. FIG. 5 illustrates a multichannel strip loaded ridge device 60 provided according to the present invention. The device 60 is similar to that of FIG. 1 and 2 in that it comprises a raised rib 62 and electrodes 63, 64 and 66 per guide. The device 60 is characterized by a plurality of micron guiding channels formed in a manner detailed hereinabove.

Although the invention has been shown and described with respect to a preferred embodiment thereof, it should be understood by those skilled in the art that various other changes, omissions and additions thereto may be made without departing from the spirit and scope of the present invention.

We claim:

1. A planar electro-optic modulator for modulating an infrared laser signal with a microwave signal to generate signals in a single frequency sideband, said modulator comprising:

a single mode thin film optical waveguide structure including a laser signal guide region and having a first major surface with optical coupling means disposed thereon at opposite ends of said guide region, said laser signal guide region providing guided propagation therethrough of the laser signal presented to said coupling means; and a microstrip electrode means having a plurality of electrodes configured on said first major surface and an electrode configured on a second major surface displaced from said first major surface in register with said guide region and having launching electrodes at each end of said microstrip electrode means for coupling microwave signals to said laser signal guide region;

said waveguide structure and said microstrip electrode means configured to launch only circularly polarized and laterally confined laser signals and microwave signals, respectively, said waveguide structure further configured so that each of said circularly polarized laser and microwave signals that propagate along said guide region are characterized by phase velocities approximately equal in magnitude.

2. The planar single sideband modulator of claim 1 wherein said structure means further comprises a first layer of gallium arsenide, on the [110] crystallographic plane thereof is epitaxially grown a semi-insulating first layer of gallium aluminum arsenide on which is epitaxially grown a layer of semi-insulating gallium arsenide, on the [111] crystallographic direction thereof is epitaxially grown a semi-insulating second layer of gallium aluminum arsenide.

3. The planar single sideband modulator of claim 2 wherein said microstrip electrode means further comprises a first metal electrode formed on a surface of said second layer of gallium aluminum arsenide in registration with said guide region, and second and third metal electrodes formed on a surface of said second layer of gallium arsenide extending along said guide region adjacent to said first electrode, thereby forming a strip loaded electrode structure.

4. The planar single sideband modulator of claim 3 wherein said second layer of gallium arsenide and said second layer of gallium aluminum arsenide are, respectively, approximately 16 microns and 8 microns in thickness.

5. The planar single sideband modulator of claim 3 wherein said second layer of gallium aluminum arsenide laterally extends along said second layer of gallium arsenide approximately 32 microns.

6. The planar single sideband modulator of claim 2 wherein said first and second layers of gallium aluminum arsenide are epitaxially grown at approximately 780° C.

7. The planar single sideband modulator of claim 2 wherein said gallium arsenide and said aluminum gallium arsenide layers are grown using metal organic chemical vapor deposition (MOCVD) with triethoxyvanadyl (TEOV) as a dopant.

8. A planar, multichannel electro-optic modulator for modulating an infrared laser signal with a microwave signal to generate signals in a single frequency sideband, said modulator comprising:

a plurality of adjacent thin film single mode optical waveguide regions each having a first major surface with an optical coupling means disposed thereon at opposite ends of said waveguide regions, said waveguide regions providing therethrough guided propagation of the laser signal presented to said coupling means; and a microstrip electrode means having a plurality of electrodes configured on said first major surface and electrodes configured on a second major surface displaced from said first major surface, each of said second major surface electrodes in register with one said waveguide regions and having launching electrodes at each end of said microstrip electrode means registered with said microwave launching electrodes, for coupling microwave signals to said waveguide regions;

each of said waveguide regions and said microstrip launching electrode configured to launch only circularly polarized and laterally confined laser signals and microwave signals, respectively, said waveguide regions further configured so that each of said circularly polarized laser and microwave signals that propagate along said waveguide regions are characterized by phase velocities approximately equal in magnitude.

9. The multichannel planar single sideband modulator of claim 8 wherein said structures further comprise a first layer of gallium arsenide, on the [110] crystallographic plane thereof is epitaxially grown a semiinsulating first layer of gallium aluminum arsenide on which is epitaxially grown a layer of semiinsulating gallium arsenide, on the [111] crystallographic direction thereof is epitaxially grown a semi-insulating second layer of gallium aluminum arsenide.

10. The multichannel planar single sideband modulator of claim 9 wherein said microstrip electrode means further comprises a first metal electrode formed on a surface of said second layer of gallium aluminum arsenide in registration with one of said guide regions, and second and third metal electrodes formed on a surface of said second layer of gallium arsenide extending along said one of said guide regions adjacent to said first electrode, thereby forming a strip loaded electrode structure.

11. The planar single sideband modulator of claim 1 wherein said second major surface comprises a top surface of an upper semiconducting layer formed on a portion of said first major surface registered with said guide region.

12. The planar single sideband modulator of claim 11 wherein said upper semiconductor layer comprises an AlGaAs layer, and wherein said first major surface comprises an upper surface of a layer of GaAs underlaying said upper AlGaAs layer.

13. The planar, multichannel single sideband modulator of claim 8 wherein said second major surface comprises a top surface of an upper semiconducting layer formed on said first major surface registered with said waveguide regions.

14. The planar, multichannel single sideband modulator of claim 13 wherein said upper semiconductor layer comprises a portion of an upper AlGaAs layer and wherein said first major surface comprises an upper surface of a layer of GaAs underlaying said upper AlGaAs layer.

* * * * *